United States Patent [19]

Fisco et al.

[11] Patent Number: 5,253,956
[45] Date of Patent: Oct. 19, 1993

[54] METHOD OF LINING BRANCH LINE

[75] Inventors: Benjamin T. Fisco, South Freeport, Me.; Hanz Tidhult, Jarfalla, Sweden

[73] Assignee: American Pipeline Supply, Corp., South Freeport, Me.

[21] Appl. No.: 844,476

[22] Filed: Mar. 2, 1992

[51] Int. Cl.$^5$ ............................................. F16L 55/16
[52] U.S. Cl. ..................................... 405/154; 156/287; 156/294; 138/97; 405/303
[58] Field of Search ............ 405/154, 157, 146, 150.1; 156/287, 294; 254/134.3 FT; 138/97

[56] References Cited

U.S. PATENT DOCUMENTS

| | | |
|---|---|---|
| 1,939,796 | 12/1933 | Spowart ..................... 254/134.3 FT |
| 3,168,908 | 2/1965 | Zurbrigen et al. ..................... 138/97 |
| 3,710,812 | 1/1973 | Wise ..................... 138/97 |
| 4,009,063 | 2/1977 | Wood . |
| 4,361,451 | 11/1982 | Renaud . |
| 4,386,628 | 6/1983 | Stanley ..................... 156/287 X |
| 4,386,629 | 6/1983 | Cook et al. . |
| 4,671,840 | 6/1987 | Renaud . |
| 4,691,728 | 9/1987 | Mathison ..................... 138/97 X |
| 4,723,579 | 2/1988 | Hyodo et al. . |
| 4,768,562 | 9/1988 | Strand . |
| 4,861,634 | 8/1989 | Renaud . |
| 5,108,228 | 4/1992 | Miyazaki et al. ............... 405/146 X |
| 5,150,989 | 9/1992 | Long et al. ..................... 405/154 X |

FOREIGN PATENT DOCUMENTS

| | | |
|---|---|---|
| 3513956 | 10/1986 | Fed. Rep. of Germany . |
| 2520021 | of 0000 | France . |
| 2537056 | 7/1982 | France . |
| 2539075 | 1/1983 | France . |
| 2540599 | 2/1983 | France . |
| 2546817 | 5/1983 | France . |
| 2592457 | 12/1985 | France . |
| 2597570 | 10/1987 | France . |
| 106924 | 8/1979 | Japan . |

Primary Examiner—Dennis L. Taylor
Attorney, Agent, or Firm—Renner, Otto, Boisselle & Sklar

[57] ABSTRACT

A liner for a closed carrier such as a sewer is pulled into place in a branch line by a cable which extends through the branch line into a main line and along the main line to an access point remote from the connection between branch and main. The branch-to-main connection is inaccessible to workers because of the small diameter of the carriers. The liner is pulled up to this connection by the cable and then cured in place thereafter the cable is removed and the liner trimmed as required. A robotic device having a cornering device mounted on it may be positioned in the main at the connection to facilitate movement of the cable around the corner from the lateral into the main.

9 Claims, 1 Drawing Sheet

METHOD OF LINING BRANCH LINE

The present invention relates to a method for repairing sewer lines or similar closed carriers, and particularly to a method for repairing a branch, lateral, or other line which joins a main or other line at a blind connection where the main is too small to permit direct human access to the connection, as well as to an apparatus useful in carrying out the method.

BACKGROUND OF THE INVENTION

Closed carriers for sewage and the like are subject to various kinds of damage. Obstruction by plant roots is one which occurs when such a carrier leaks and the moisture attracts the roots. Damage may also occur because of shifting or settling of the earth surrounding the carrier or of structures to which the carrier is connected. Indeed damage can arise from causes as various as the vagaries of nature, and regardless of cause, the damage may require repair.

One well known technique for repairing a damaged closed carrier such as a sewer line is to clear the line using any of a variety of snakes, jets, robots or other well known equipment. After the carrier is clear it is lined with a fluid impermeable liner. Lining has been accomplished by pulling a fabric liner saturated with a curable resin into the carrier, inflating a bladder inside the liner to press the liner against the inside of the carrier while the resin cures and then removing the bladder. Various remote control machines are available to trim and grind the ends of such a liner to assure uninterrupted flow through the carrier. This lining method has worked well in some circumstances, as it leaves a thin, chemical resistant, smooth and impenetrable liner inside the carrier.

One difficulty with this prior art lining technique is that heretofore it has not been possible to line a portion of a carrier that was not easily accessible at both ends. Access to one end of a carrier has been required to feed in the resin-saturated liner, and access to the opposite end has been required for pulling a cable attached to the liner to place the liner properly inside the carrier before inflating it. This requirement for access has precluded using the lining technique described on branch or lateral carriers which connect to a main carrier without a manhole or other service access at the connection. Such "blind" connections are typical of, e.g., the connection of a sewer line from a residence to a municipal sewer main line, typically found under or adjacent the street in front of the residence. In making a residential sewer connection, it is typical to use a T fitting to join the residential line of between 4 inches and 8 inches in (internal) diameter with the sewer main. The sewer main may be 12, 16, 18 or more inches in (internal) diameter, but the sewer main is usually too small to permit a worker direct access to the interior of the lateral connection. Generally in such a connection the axis of the branch line is perpendicular to the axis of the main, although connections at other angles such as 45° Ys are also used on occasion. Thus a connection is "blind" or inaccessible where it is not feasible to get a worker at the connection by moving through one of the carriers that forms the connection.

Heretofore liners have not been pulled into a lateral line through such a blind connection. Friction where the cable must bend around the connection from the lateral line to the main damages the cable itself, and excessive force on the cable has been necessary. Therefore, the lining technique described has not been available for a great many applications for which it would otherwise be suited, and resort has often been had to excavation of the entire line to make a repair. Excavation not only is more expensive than lining, but also it disrupts landscaping, sidewalks and other intervening structures.

SUMMARY OF THE INVENTION

The present invention provides a technique for lining a lateral closed carrier for sewage which joins a main closed carrier at a blind connection and an apparatus useful in practicing the method. First, access is provided at the distal end of the lateral to be lined. This distal access may be through an established cleanout, by making a new opening or even through a stack vent. A cable is introduced into the carrier at the distal access point and guided down the lateral through the connection and into the main. The cable is brought up from the main at a nearby manhole or other access point. Next a liner, saturated with a curable resin, is attached to the cable at the distal access point and the cable is pulled to draw the liner into the lateral. Once the liner is in its desired location it is inflated and cured. Thereafter the cable is disconnected from the cured liner, any necessary trimming is done at the ends of the liner, the distal access is closed, if necessary, and the job is complete.

In a preferred technique the method also includes placing a cornering device in the main at the connection between the lateral and main to ease movement of the cable around the corner. This cornering device may include a roller mounted on a remotely operable robot and positioned with the aid of a video camera.

The invention then comprises the method and apparatus set forth in the appended claims. The various features and preferred technique for practicing the present invention will become clear from the following description.

DESCRIPTION OF PREFERRED EMBODIMENT

Figure 1:
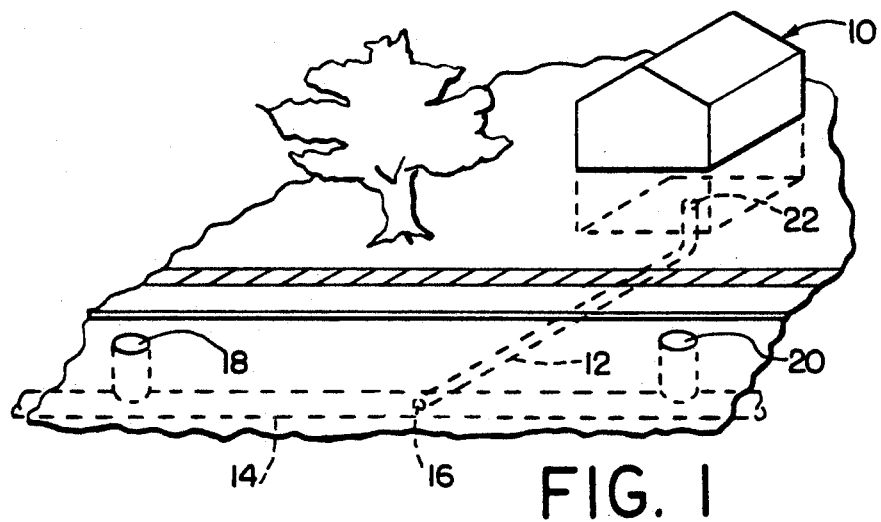
FIG. 1 is a schematic illustration of a lateral closed carrier for sewage extending between a residence and a sewer main, the lateral being suitable for lining by the method of the present invention.

FIG. 1 illustrates a house or other structure 10 with a closed carrier 12 which carries sewage or waste water from the structure to main carrier 14 located below ground in front of the structure. The carrier 12 is a branch or lateral carrier, and it joins the main 14 at a blind connection 16. It should be noted that the carrier 12 is illustrated as being straight. This is an idealized situation, for the carrier 12 is formed of a number of conventional segments which are joined together. This process allows some curvature, and less commonly the carrier 12 may also include an elbow which changes the direction of the carrier.

The connection 16 is termed a blind connection because there is no access to it other than by excavation.

In the figure the connection 16 is shown as being about midway between two manholes 18 and 20, although this is for purposes of illustration only, and in usual construction the manholes or other access point to the carrier 14 would be much farther apart, and not necessarily equidistant from the connection 16. The connection 16 is shown as a right angle connection in which the axis of lateral carrier 12 is perpendicular to the axis of main carrier 14. Some connections are constructed with a Y shape so that the lateral enters the main at a 45° angle, but this has no effect on the method of the present invention.

To practice the invention it is necessary to gain access to the carrier 12 at the distal end of the carrier 12, or at least upstream of where lining of the carrier is required. Typically this is done inside the structure 10. Access may be by opening a preexisting cleanout, by cutting into the carrier 12 or by entering a stack vent (not shown) on the roof of the structure. For purposes of illustration the access point 22 is shown as an opening in the floor of the structure 10.

Figure 2:
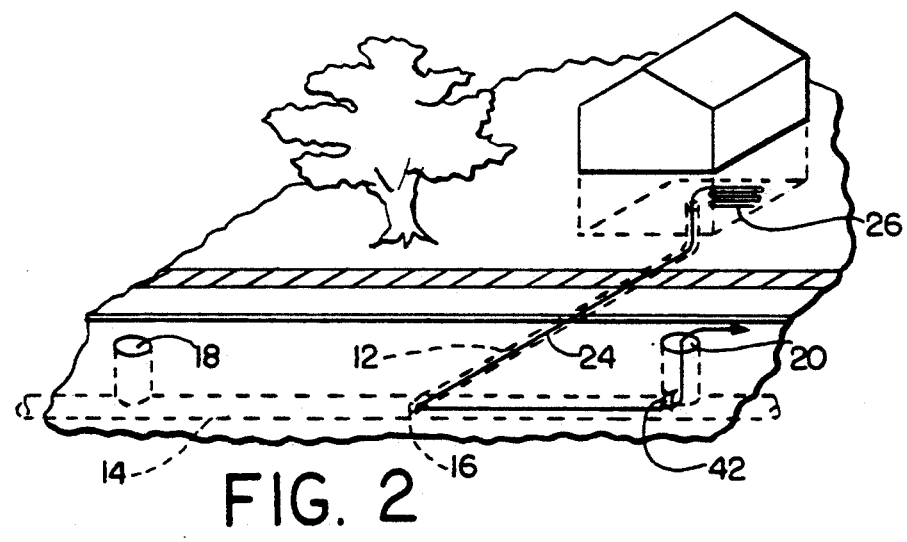
FIG. 2 is similar to FIG. 1 but shows a cable passed through the lateral, into a main and up through an access point to the main and with a linear ready to be pulled into the lateral.

Once access to the carrier 12 is established, a cable 24 (FIG. 2) is passed through carrier 12, into the main 14 and along the main until it is pulled up through access point 18 or 20. This feat is conventional in the sewer cleaning business. Typically the cable is "jetted", using a rear facing nozzle supplied with water under high pressure to pull the cable 24 into place. Of course, before it is possible to pass a cable through the carrier, it may be necessary to clean out debris using conventional equipment such as snakes, root cutters and even remote controlled machines.

Once the cable 24 has been passed as described, a conventional liner 26 is attached to the distal end of the cable. The liner 26 is saturated in a curable resin in a conventional manner, and pulled into the carrier 12. This is accomplished by pulling on the cable 24 at the access point 20 and so moving the cable along the main 14, around a corner at the connection 16 and along the lateral 12. Pulling on the cable continues until the leading end of the liner reaches the connection 16. This event can be determined by means of a remotely operated video camera position in the main carrier 14.

After the liner 26 is in place, it is pressed against the inside of the carrier 12 in a conventional manner. While there are various techniques known, one technique is to provide the liner with an inflatable bladder (not shown) and fill it with air to press the liner radially outward. This causes the liner to conform to the interior contours of the carrier 12, and thereafter the liner is cured. This may be done by using a thermosetting resin to impregnate the liner and heating the bladder or by using an epoxy resin and catalyst which are mixed prior to being impregnated into the liner. In any event the liner is caused to harden in place against the inside of the carrier 12 to form a liner with the desired properties. After the bladder is used to press the liner into position, the bladder is removed.

Once the liner is hardened in place, its proximal and distal ends are trimmed as required. For example, at the proximal end in the connection 16, it is important that the liner not project inward to block any part of the flow through carrier 14. There are known techniques for accomplishing this trimming, one of which is to use a remote controlled robot, such as that available through Sika Robotics AG, Pipe Repair Systems, CH-8627 Grüningen, Switzerland.

To facilitate pulling the cable 24 through the connection 14 a cornering device may be used. This cornering device is positioned in the main 14 at the connection 16 and serves to ease the movement of the cable 24 around the corner into the main. To this end the cornering device may be a simple shoe or doughnut over or through which the cable 24 runs as it turns the corner at the connection 24. Alternatively the cornering device may be a roller such as roller 28 illustrated in FIG. 3.

Figure 3:
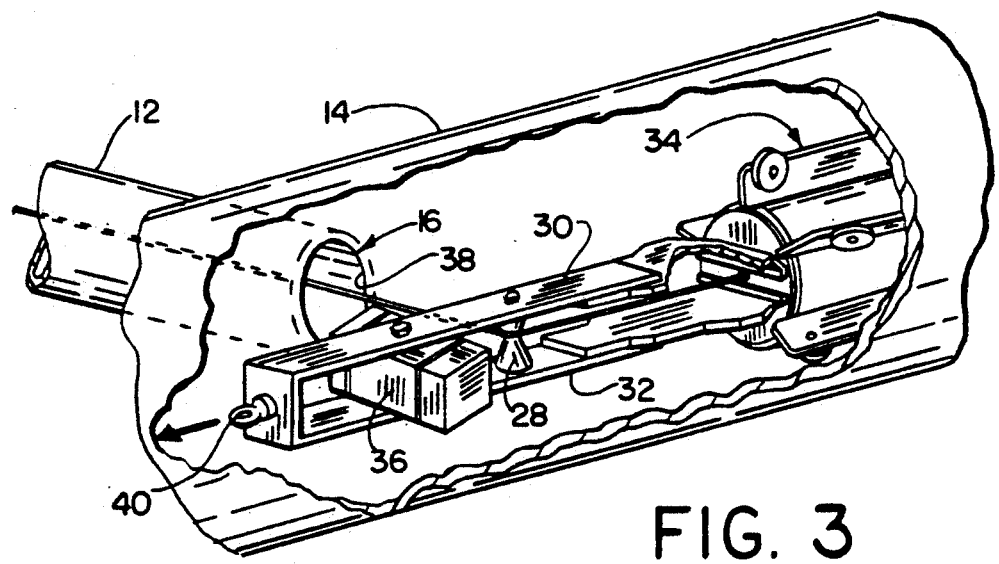
FIG. 3 illustrates an apparatus useful in carrying out the present invention.

In FIG. 3 the roller 28 is mounted between two arms 30 and 32 which in turn are mounted on the leading end of a self-propelled, remotely operable robot 34 such as that manufactured by Sika Robotics AG. The robot 34 also carries a remotely operable video camera 36 which is mounted between the arms 30 and 32. If a cornering device such as roller 28 mounted on robot 34 is used, the cable 24 may be threaded through the robot after the cable has been jetted through carriers 12 and 14 and up at access point 20 but before the robot is placed into the main 14. Once the robot 34 is threaded and in the main 14, it may be remotely driven along the main until it is located adjacent the connection 16 with the roller 28 located to guide the cable 24 over the roller and into the carrier 12 without contacting the corner 38 defined by the intersection of carriers 12 and 14.

The robot 34 is sufficiently massive that it can maintain its position as the cable 24 is pulled. However, if the robot should slip due to the force of the cable 24 on the roller 28, a second cable (not shown) can be attached to eye 40 and used to hold the robot in position.

A conventional roller shoe 42 may be used to ease movement of the cable 24 around the intersection of the main carrier 14 and the access point 20. Such roller shoes are common when pulling cables through carriers between access points such as manholes 18 and 20, and therefore require no further description.

Thus it is clear that the present invention provides a technique not heretofore thought possible to line a branch or lateral closed carrier 12 which joins a main carrier 14 at a blind connection 16. This is accomplished by pulling a liner 26 through the lateral using a cable 24 which extends through the lateral's connection 16 with the main 14, into the main and out of the main at an access point 20 remote from the connection 16. The movement of the cable 24 around the connection 16 may be facilitated by the use of a remotely positionable cornering device such as a roller mounted on a self-propelled robot 34.

What is claimed is:

1. A method of lining at least a selected portion of a first closed carrier such as a sewer lateral which makes a blind connection to a second closed carrier such as sewer main at a point remote from an access point to the sewer main so that the connection is therefore not readily accessible to a person, said method comprising the steps of:

providing an access opening at the distal end of the selected portion of the first carrier, introducing a cable end into the distal end opening and guiding the cable through the first carrier, through the blind connection, into the second carrier and up through a point of access to the second carrier at a point remote from the connection, attaching a liner to the cable at the distal end access opening, and guiding the cable through the blind connection while pulling the liner with the cable through the lateral until the liner is positioned in the selected portion of the lateral.

2. The method of claim 1 including the step of positioning a cornering device in the second carrier adjacent the blind connection with the first carrier and the step of guiding the cable through the blind connection includes the step of guiding the cable with the cornering device.

3. The method of claim 2 wherein the step of positioning a cornering device includes the step of attaching a roller to a maneuverable device and guiding the device through the second carrier to the connection with the first carrier.

4. The method of claim 3 wherein the step of guiding the device includes the step of pulling the device with a cable that extends between two access points.

5. The method of claim 3 wherein the step of guiding the device includes remotely guiding a self-propelled device.

6. An apparatus for use in pulling a liner into a portion of a first closed carrier such as a sewer which is accessible at one end of the portion to be lined and which terminates with a blind connection with and at an angle to a second carrier which is readily accessible only at a point remote from the connection between the two carriers, said apparatus comprising cornering means for guiding a cable around a corner formed at the blind, angled connection between the first carrier and the second carrier so as to enable the cable to extend through the first carrier and the blind connection and into the second carrier around the angle at the blind connection so as to pull a liner into the first carrier, remotely operable vehicle means, and means for mounting said cornering means to said vehicle means, said vehicle means being for moving within said second carrier to position the cornering means at said connection.

7. The apparatus of claim 6 wherein said cornering means includes a roller mounted to said vehicle.

8. The apparatus of claim 7 wherein said mounting means includes a pair of arms extending from on end of said vehicle means, said roller being mounted for rotation about an axis which extends between said arms.

9. The apparatus of claim 8 including a video camera mounted to said arms.

* * * * *